United States Patent
Breau et al.

(10) Patent No.: US 7,876,728 B1
(45) Date of Patent: Jan. 25, 2011

(54) MAINTAINING PATH OPTIMIZATION DURING FOREIGN AGENT HANDOFF

(75) Inventors: Jeremy R. Breau, Kansas City, MO (US); Serge M. Manning, Overland Park, KS (US); C. Brent Hirschman, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 644 days.

(21) Appl. No.: 11/839,946

(22) Filed: Aug. 16, 2007

Related U.S. Application Data

(63) Continuation-in-part of application No. 11/697,139, filed on Apr. 5, 2007.

(51) Int. Cl.
*H04Q 7/00* (2006.01)

(52) U.S. Cl. .................................. 370/331; 370/310.2

(58) Field of Classification Search ............. 370/310.2, 370/312, 331, 328, 338, 349
See application file for complete search history.

(56) References Cited

U.S. PATENT DOCUMENTS

| | | | |
|---|---|---|---|
| 6,928,282 | B2 | 8/2005 | Taniguchi |
| 6,985,463 | B1 * | 1/2006 | Wright et al. ............... 370/331 |
| 7,460,547 | B2 | 12/2008 | Thubert |
| 7,536,482 | B1 | 5/2009 | Lau |
| 7,577,119 | B2 * | 8/2009 | Yokota et al. ............... 370/331 |
| 7,609,668 | B1 * | 10/2009 | Smith .......................... 370/328 |
| 2002/0015396 | A1 | 2/2002 | Jung |
| 2003/0045287 | A1 | 3/2003 | Taniguchi |
| 2004/0047322 | A1 | 3/2004 | O'Neill |
| 2004/0066760 | A1 | 4/2004 | Thubert |
| 2004/0136337 | A1 | 7/2004 | Warrier |
| 2004/0141477 | A1 | 7/2004 | Xu |

OTHER PUBLICATIONS

Non Final Office Action of U.S. Appl. No. 11/697,139, mailed Jun. 9, 2010.

* cited by examiner

*Primary Examiner*—Brenda Pham

(57) ABSTRACT

A method, system, and computer-readable media are provided for maintaining optimized communication after a mobile device transitions to a new foreign agent during a communication session. When a mobile device moves to and registers with a new foreign agent within a communication session, the mobile device's home agent multicasts a message to all foreign agents within an optimization cluster informing them of the updated registration. Accordingly, the foreign agents within the optimization cluster can proceed to transmit data packets directly to the new foreign agent servicing the mobile device within the communication session.

13 Claims, 6 Drawing Sheets

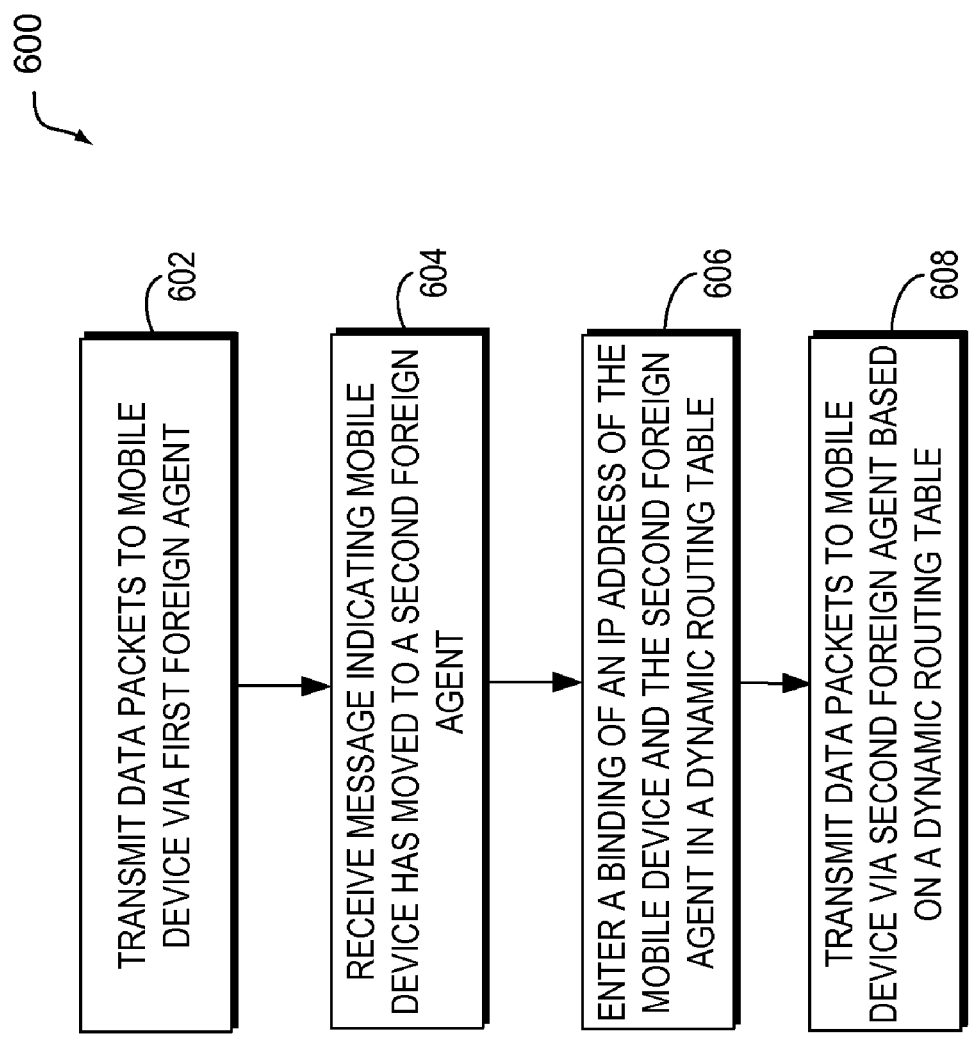

MAINTAINING PATH OPTIMIZATION DURING FOREIGN AGENT HANDOFF

CROSS-REFERENCE TO RELATED APPLICATIONS

This application is a Continuation In Part of application Ser. No. 11/697,139, Entitled "Foreign Agent Address Assignment For Mobile IP Path Optimization," filed Apr. 5, 2007, which is incorporated by reference herein in its entirety.

STATEMENT REGARDING FEDERALLY SPONSORED RESEARCH OR DEVELOPMENT

Not applicable.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention is defined by the claims below. Embodiments of the present invention solve at least the above problems by providing a system and method for, among other things, maintaining optimized communication after a mobile device transitions to a new foreign agent during a communication session.

In a first aspect, a set of computer-readable media provides a method that includes receiving a first registration request from a mobile IP client associated with a communication session. The method further includes identifying a pool of IP addresses assigned to a first foreign agent associated with a mobile device of the mobile IP client. Additionally, the method includes assigning an IP address from the identified pool of IP addresses to the mobile device. Furthermore, the method includes receiving a second registration request from the mobile IP client for registering with a second foreign agent within the communication session. Moreover, the method includes binding the assigned IP address with an IP address of the second foreign agent, and multicasting the binding to all foreign agents within an optimization cluster.

In a second aspect, a set of computer-readable media provides another method that includes transmitting data packets to a destination mobile device via a first foreign agent within a communication session based on routing instructions found within a static routing table. The method further includes receiving a message indicating the destination mobile device has moved to a second foreign agent within the communication session. Moreover, the method includes entering a binding of an IP address of the destination mobile device and the second foreign agent into a dynamic routing table. Furthermore, the method includes transmitting data packets to the destination mobile device via the second foreign agent based on routing instructions found within the dynamic routing table.

In a third aspect, a system is provided that includes one or more home agents for assigning pools of IP addresses to each of a plurality of foreign agents; assigning an IP address to a mobile device from a pool of IP addresses associated with a first foreign agent when the mobile device registers with the first foreign agent for a communication session; updating a binding table when the mobile device registers with a second foreign agent within the communication session; and multicasting a message to multiple foreign agents within an optimization cluster informing the multiple foreign agents of the mobile device's registration with the second foreign agent. The system also includes one or more foreign agents for routing data packets directly to the first foreign agent when the data packets include the assigned IP address; receiving the multicasted message related to the mobile device's registration with the second foreign agent; and transmitting the data packets directly to the second foreign agent when the data packets include the assigned IP address after receiving the message related to the mobile device's registration with the second foreign agent.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 6 is a flow diagram of another exemplary method for maintaining optimized communication after a mobile device transitions to a new foreign agent during a communication session according to an embodiment of the invention.

DETAILED DESCRIPTION

Various technical terms are used throughout this description. A definition of such terms can be found in Newton's *Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media which includes computer-storage media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The present invention is a Continuation-in-Part of patent application Ser. No. 11/697,139 (hereinafter the '139 application) entitled "Foreign Agent Address Assignment for Mobile IP Path Optimization." The present invention hereby incorporates the '139 application by reference. The following describes various aspects of the '139 application that may be employed by the present invention in creating an optimized communication path between multiple mobile devices via foreign agents located within the same geographical location.

Creation of an Optimized Communication Path

Figure 1:
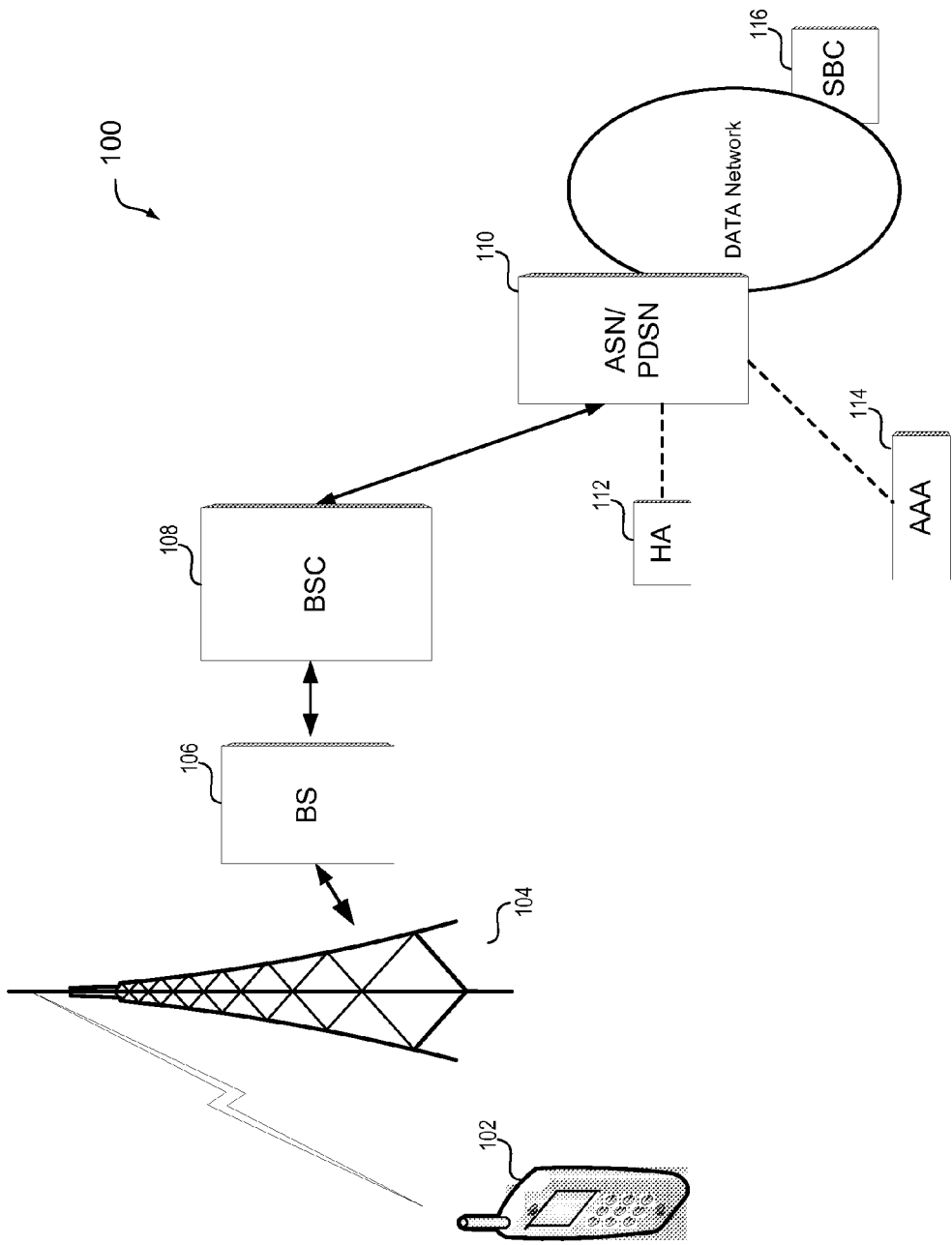
FIG. 1 is a block diagram of an embodiment of a communication network that can be employed by the invention.

FIG. 1 is a block diagram of an embodiment of a communication network 100 that can be employed by the invention. Mobile device 102 may be or can include a laptop computer, a network-enabled mobile telephone (with or without media capturing/playback capabilities), a wireless email client, a personal digital assistant (PDA), or other software client. The mobile device 102 may also include a machine or device to perform various tasks including video conferencing, web browsing, search, electronic mail (email) and other tasks, applications and functions. Mobile device 102 may additionally be a portable media device such as digital camera devices, digital video cameras (with or without still image capture functionality), media players such as personal music players and personal video players, and other portable media devices. The mobile device 102 can include a communication interface that can allow the mobile device 102 to transmit information via radio signals to a communication tower 104.

The Base Station (BS) 106 contains equipment for transmitting and receiving of radio signals from a communication tower 104. BS 106 also has other equipment for encrypting and decrypting communication with the Base Station Controller (BSC) 108. The BSC 108 may be configured to receive radio signals that are converted into Time Division Multiplexing (TDM) from a BS 106. In an embodiment, the BSC 108 can have a plurality of BSs under its control. The BSC 108 may handle the allocation of radio channels, may receive measurements from mobile devices, and can control handovers from one BS to another BS. Another function of the BSC 108 is to act as a concentrator of communication sessions where many different low capacity connections to the BSs (with relatively low utilization) become reduced to a smaller number of connections toward a Mobile Switching Center (MSC) (with a high level of utilization). The BSC may also be configured to send voice information from the TDM signal to the MSC and data information to an Access Service Network (ASN) or a Packet Data Serving Node (PDSN) 110.

The ASN/PDSN 110 may be a component of a mobile network. The ASN/PDSN 110 may act as a connection point between the Radio Access and Internet Protocol (IP) networks. The ASN/PDSN 110 component may be responsible for managing Point-to-Point Protocol (PPP) sessions between the mobile device's core IP network and the mobile device. The Home Agent (HA) 112 may be a router located in a home network of the mobile device 102. The HA 112 allows a mobile device to connect to the Internet or data network by assigning an IP address and binding it to a Care-of-Address (COA). The HA 112 can forward packets to an appropriate network when a mobile device is away from its home area or home network. An authentication, authorization, and accounting (AAA) server 114 is a server program that handles user requests for access to a network and provides AAA services. The AAA server 114 may interact with network access servers, gateway servers, databases, and directories containing user information. A Session Border Controller (SBC) 116 may be a device used in some Voice over Internet Protocol (VoIP) networks to exert control over the signaling and media streams involved in setting up, conducting, and tearing down calls. The SBC 116 may be put into the signaling and/or media path between the party making a call and the party receiving the call. In an embodiment, the SBC 116 may act as a VoIP phone when it receives a call from a calling party and can place a second call to the called party. The effect of this behavior may be that the signaling traffic and media traffic (voice, video, etc.) crosses the SBC. This behavior may also be prevalent during conference communications.

Figure 2:
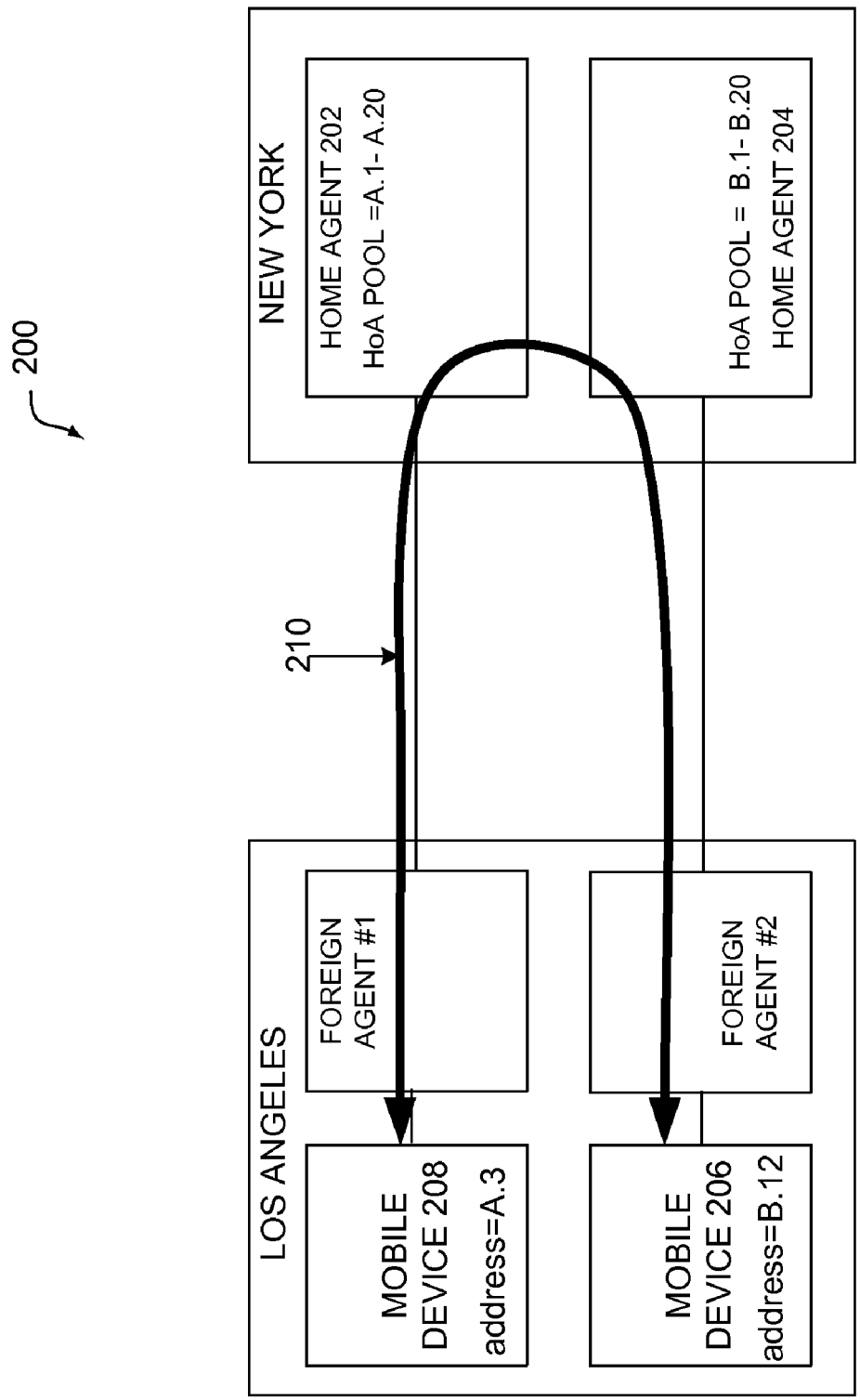
FIG. 2 is a block diagram of a system for facilitating a communication session between two mobile devices that are away from their home networks.

FIG. 2 is a block diagram of a system 200 for facilitating a communication session between two mobile devices that are away from their home networks. In FIG. 2, mobile devices 206 and 208, each located in foreign networks in Los Angeles, have home networks and respective home agents 202 and 204 located in New York. In this example, mobile device 208 may be a source mobile device that initiates a communication session with mobile device 206. Mobile device 208 first registers with its home agent 202 through foreign agent #1. The mobile device sends a registration request to foreign agent #1 that includes the IP address of its home agent and the care-of-address of Foreign agent #1. Foreign agent #1 forwards the registration request to the home agent 202. The home agent 202 authenticates the requests and assigns an IP address to the mobile device 208 from its default Home Address (HoA) pool. The HoA pool includes IP addresses A.1-A.20. When assigning the HoA, the home agent 202 selects the next available IP address from the pool with zero intelligence. In this example, the home agent selects and assigns IP address A.3 to the mobile device 208, and sends the selected IP address to the mobile device 208 through foreign agent #1.

Once the mobile device 208 receives the assigned IP address (A.3), it can begin to send data packets to mobile device 206 through foreign agent #1. Foreign agent #1 will use a reverse tunneling procedure to establish a communication link with the home agent 202 in order to transfer the data packets to the mobile device 206. Within the data packets, the IP address of the mobile device's 206 home agent 204 will be identified. The data packets are then routed to the home agent 204, and the home agent 204 selects the next available IP address within its HoA pool. The home agent 204 assigns the selected IP address to the mobile device 206 and tunnels the selected IP address along with the data packets to foreign agent #2. Foreign agent #2 then sends the selected IP address and data packets to the mobile device 206.

Path 210 shows the route data packets travel when being sent from one mobile device to the other. As depicted, the data packets must travel across the United States from Los Angeles to New York and then back to Los Angeles in order to be received. Such a path is not the best route for the data packets to travel. A more optimal path would be to route the data packets within the same geographic location without having to waste additional time and resources sending the data packets to the home agents in New York. As shown, the foreign agents are in the same geographic location of Los Angeles. In other embodiments, two foreign agents may be considered to be in the same geographic location if they are in the same state or within a predetermined distance away from each other.

Figure 3:
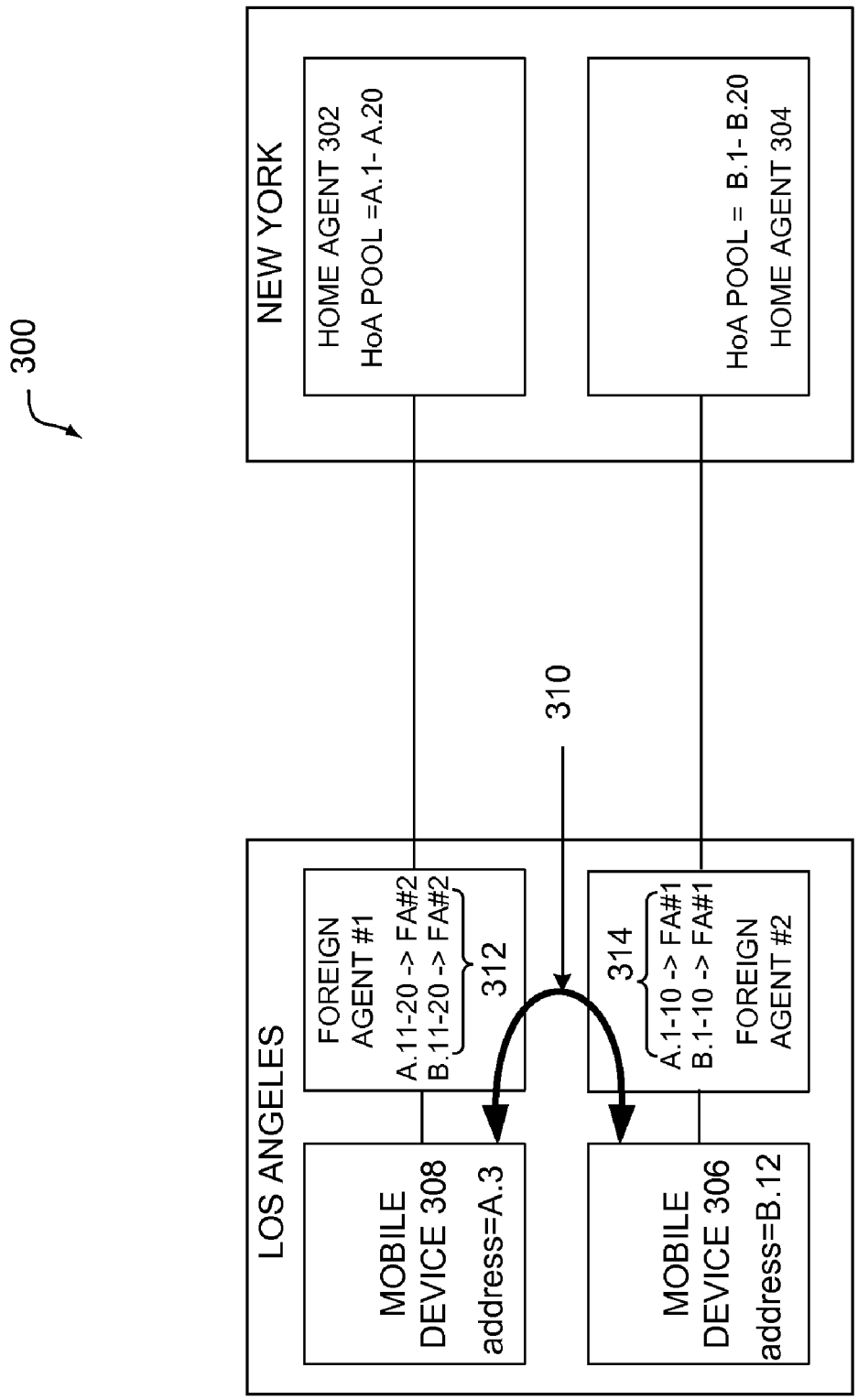
FIG. 3 is a block diagram of an exemplary system for facilitating a communication session between two mobile devices that are away from their home networks according to an embodiment of the invention.

FIG. 3 is a block diagram of an exemplary system 300 for facilitating a communication session between two mobile devices that are away from their home networks according to an embodiment of the invention. Path 310 is an optimized communication path that shows a route data packets travel between two mobile devices without having to be transmitted or reversed tunneled to each mobile device's home agent. The optimized communication path 310 is obtained by including static routing tables with routing logic that informs a foreign agent where to route a data packet based on a destination IP address of the data packet. The routing logic within each foreign agent's static routing table may include information from one or more home agents that informs a foreign agent where to route data packets based on the IP address the home agent assigns to a mobile device.

Before a mobile device registers with a home agent, the static routing tables are provided to the foreign agents. The routing logic in the static routing tables is based on home agents assigning a pool of IP addresses to one more foreign agents. For example, in FIG. 3, home agent 302 has divided its list of IP addresses (A.1-A.20) into two separate pools. A first pool of IP addresses, including IP addresses A.1-A.10, is created and assigned to foreign agent #1. The home agent 302 will associate foreign agent #1's IP address with the first pool of IP address and will store the association in its binding table. A second pool of IP addresses, including IP addresses A.11-A.20, is created and assigned to foreign agent #2. The home agent 302 will associate foreign agent #2's IP address with the second pool of IP address and will store the association in its binding table. Similarly, home agent 304 has divided its list of IP addresses (B.1-B.20) into two separate pools. A first pool of IP addresses, including IP addresses B.1-B.10, is created and assigned to foreign agent #1. The home agent 304 will associate foreign agent #1's IP address with the first pool of IP address and will store the association in its binding table. A second pool of IP addresses, including IP addresses B.11-B.20, is created and assigned foreign agent #2. The home agent 304 will associate foreign agent #2's IP address with the second pool of IP address and will store the association in its binding table.

Each home agent then informs each foreign agent of their respective assignment of IP addresses. Each home agent also provides routing logic to be included in a static routing table that informs the foreign agents where to route data packets based on the pool of addresses the home agents have assigned to each foreign agent. For example, foreign agent #1 includes routing logic 312 that informs the foreign agent that a data packet with a destination IP address between A.11-A.20 or B.11-B.20 should be routed to foreign agent #2. Similarly, foreign agent #2 includes routing logic 314 that informs the foreign agent that a data packet with a destination IP address between A.1-A.10 or B.1-B.10 should be routed to foreign agent #1.

Thereafter, mobile device 308 registers itself with home agent 302 through foreign agent #1 and is assigned IP address A.3, and mobile device 306 registers itself with home agent 304 through foreign agent #2 and is assigned IP address B.12. Accordingly, when mobile device 308 wants to send a data packet to mobile device 306, the mobile device 308 will first send the data packet to foreign agent #1. Foreign agent #1 will identify the destination IP address of the packet as being B.12 and will scan its static routing table to see if the B.12 IP address is associated with a foreign agent. When foreign agent #1 scans its static routing table, the routing logic will instruct foreign agent #1 to route the data packet to foreign agent #2 since the IP address B.12 is associated with foreign agent #2. In an embodiment, foreign agent #1 can transmit the data packet over a generic route encapsulation (GRE) link to foreign agent #2. Once the data packet is sent to foreign agent #2, foreign agent #2 can then transmit the data packet to mobile device 306. When mobile device 306 wants to send a data packet to mobile device 308, the mobile device 306 will first send the data packet to foreign agent #2. Foreign agent #2 will identify the destination IP address of the data packet as being A.3 and will scan its static routing table to see if the A.3 IP address is associated with a foreign agent. When foreign agent #2 scans its static routing table, the routing logic will instruct foreign agent #2 to route the data packet to foreign agent #1 since the IP address A.3 is associated with foreign agent #1. In an embodiment, foreign agent #2 can send the data packet over the GRE link to foreign agent #1. Once the data packet is sent to foreign agent #1, foreign agent #1 can then transmit the data packet to mobile device 308.

In an embodiment, if a mobile device moves away from the coverage area of a first foreign agent after an optimized path, such as path 310, has been established, the first foreign agent can send an Internet Control Messaging Protocol (ICMP) message to the other foreign agent. The ICMP message informs the other foreign agent that the first foreign agent is no longer providing service to the mobile device. For example, if during a communication session mobile device 306 moves away from the service area of foreign agent #2 after the optimized path 310 has been created, foreign agent #2 can send an ICMP message to foreign agent #1 to inform foreign agent #1 that foreign agent #2 is no longer communicating with mobile device 306. Foreign agent #1 can then proceed to reverse tunnel data packets from mobile device 308 to home agent 302 and subsequently to mobile device 306 using a path 210 as described in FIG. 2 that would include the mobile device 306's new foreign agent.

However, in the mobile device 308's transition to the new foreign agent, reverse tunneling data packets from the mobile device 308 to the home agent 302 dissolves the optimized path 310 that was created using the techniques described in the '139 application. Destroying the optimized path 310 after a mobile device transitions to another foreign agent therefore introduces the problems associated with reverse tunneling data packets to a mobile device's home agent that the '139 application wanted to overcome. Accordingly, the present invention introduces techniques for maintaining an optimized communication path even after a mobile device transitions to a new foreign agent within the same communication session.

Maintaining Optimized Communication after Transition to New Foreign Agent

Figure 4:
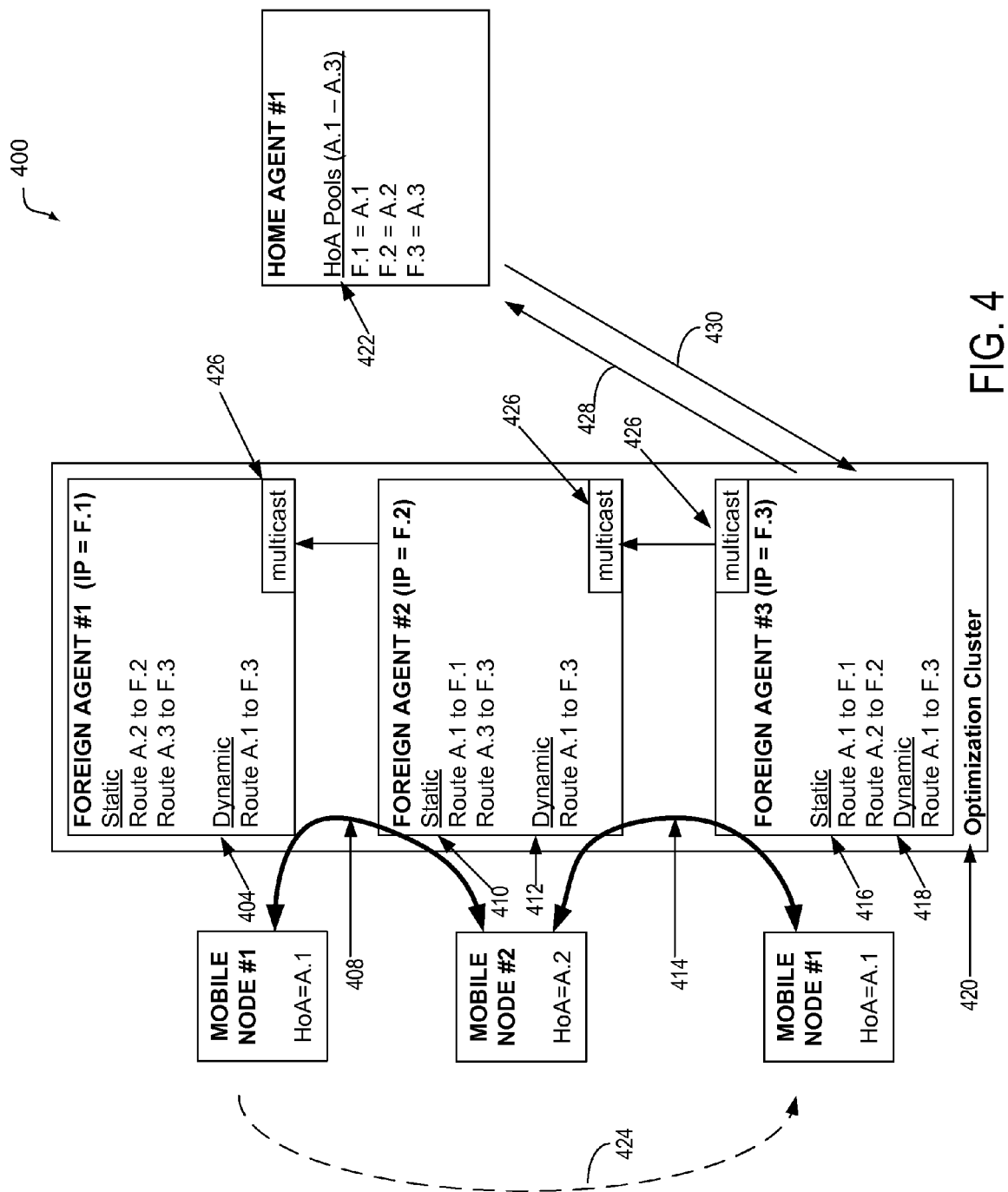
FIG. 4 is a block diagram of an exemplary system for maintaining optimized communication after a mobile device transitions to a new foreign agent during a communication session according to an embodiment of the invention.

FIG. 4 is a block diagram of an exemplary system 400 for maintaining optimized communication after a mobile device transitions to a new foreign agent during a communication session according to an embodiment of the invention. System 400 includes home agent #1, foreign agent #1, foreign agent #2, foreign agent #3, mobile device #1, and mobile device #2. Foreign agents 1-3 are part of an optimization cluster 420 that defines a group of foreign agents servicing a given geographical location. The scope of the geographical location may be determined by the creator of the optimization cluster. Home agent #1 comprises a pool of IP addresses in its binding table 422 that includes IP addresses A.1-A.3. The binding table 422 reflects that the A.1 IP address is assigned to foreign agent #1 (F.1=A.1), the A.2 IP address is assigned to foreign agent #2 (F.2=A.2), and the A.3 IP address is assigned to foreign agent #3 (F.3=A.3).

Each foreign agent's static routing table is incorporated with routing logic according to the home agent #1's assignment of IP addresses. As shown, foreign agent #1's static routing table 402 informs it to route data packets with a destination IP address of A.2 to foreign agent #2, and to route data packets with a destination IP address of A.3 to foreign agent #3. Foreign agent #2's static routing table 410 informs it to route packets with a destination IP address of A.1 to foreign agent #1 and to route data packets with a destination IP address of A.3 to foreign agent #3. Foreign agent #3's static routing table 416 informs it to route packets with a destination IP address of A.1 to foreign agent #1 and to route data packets with a destination IP address of A.2 to foreign agent #2.

In the example illustrated in FIG. 4, mobile devices #1 and #2 happen to have the same home agent #1. When mobile device #1 registers with foreign agent #1 for a communication session with mobile device #2, the mobile device #1 is assigned the A.1 IP address from the home agent #1 based on foreign agent #1's IP address. The home agent #1 then updates its binding table to reflect that mobile device #1, with IP address A.1, is currently registered with foreign agent #1. When mobile device #2 registers with foreign agent #2 for the communication session with mobile device #1, the mobile device #2 is assigned the A.2 IP address from the home agent #1 based on foreign agent #2's IP address. The home agent #1 then updates its binding table to reflect that mobile device #2, with IP address A.2, is currently registered with foreign agent #2. Once mobile device's #1 and #2 are assigned IP addresses from home agent #1, optimization path 408 is created between foreign agents #1 and #2 through use of the routing logic within their respective routing tables and with the other techniques described in FIG. 3.

If mobile device #1 moves to another foreign agent, such as foreign agent #3 as shown with arrow 424, during the communication session with mobile device #2, a mobile IP (MIP) client (mobile device #1 or a component of a wireless network service provider for example) sends a MIP registration request 428 to home agent #1 so that mobile device #1 can register with foreign agent #3. The MIP registration request may be sent to home agent #1 via foreign agent #3. The MIP registration request includes the IP address of foreign agent #3 (F.3).

If the home agent #1 approves the MIP registration request, home agent #1 will update its binding table to reflect that mobile device #1, with the A.1 IP address, is registered with foreign agent #3. Home agent #1 will then proceed to send a MIP registration reply 430 to the MIP client via the foreign agent #3 to confirm its approval of the MIP registration request.

Typically, once mobile device #1 migrates to and registers with foreign agent #3, foreign agent #2 will have to reverse tunnel data packets from mobile device #2 to home agent #1 in order to transmit the data packets to mobile device #1. However, the invention overcomes this problem by multicasting 426 the MIP registration reply from the home agent #1 (in response to the MIP client's registration request) to all foreign agents within the optimization cluster 420. Once each foreign agent receives the multicasted MIP registration reply, an entry into a dynamic routing table of each foreign agent (tables 404, 412, and 418) is created that informs the foreign agents to route data packets with destination IP address A.1 to foreign agent #3. Each foreign agent can be programmed to follow the routing instructions found in their respective dynamic routing tables before following the conflicting instructions found in their static routing tables. Accordingly, foreign agent #2 will know not to continue forwarding data packets from mobile device #2 to mobile device #1 via foreign agent #1; rather, it will know that it should forward such packets to foreign agent #3. With such knowledge, optimization path 414 can be established between foreign agent #2 and #3 for the communication session between mobile device #1 and #2. Once the communication session is terminated, the home agent #1 can send a message that is multicasted to all foreign agents within the optimization cluster 420 to inform them of the termination. Once the multicasted message is received, each foreign agent can erase the dynamic entries from their dynamic routing tables that were associated with the communication session. Normal routing procedures found within the foreign agents' static routing tables are then resumed.

Figure 5:
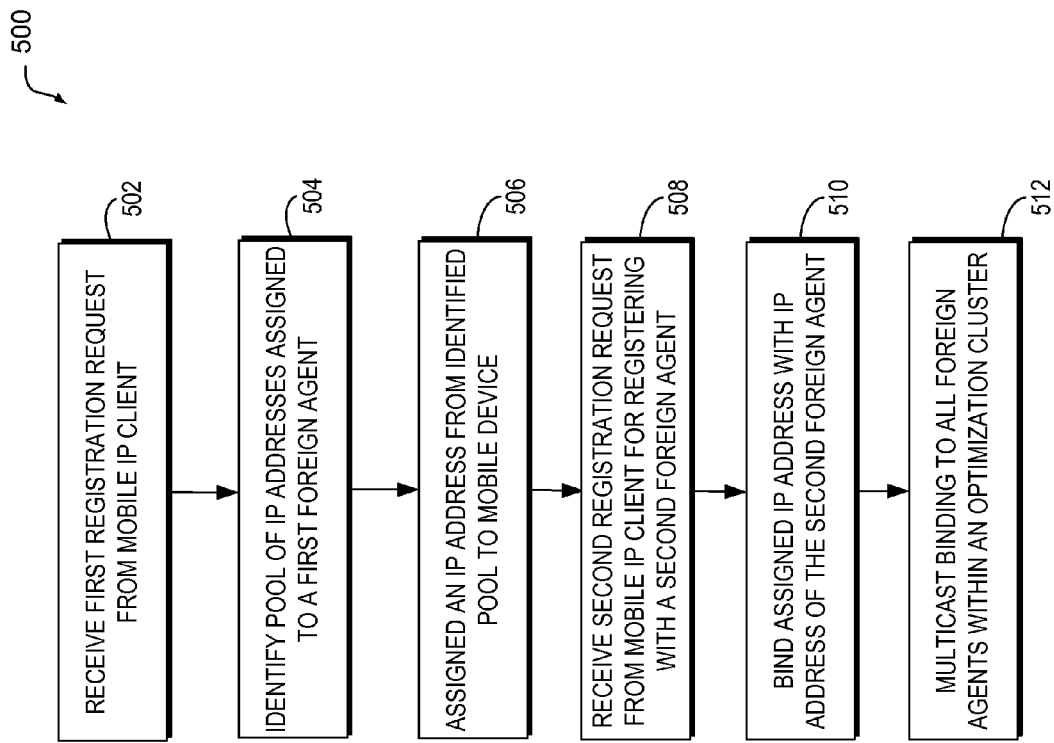
FIG. 5 is a flow diagram of an exemplary method for maintaining optimized communication after a mobile device transitions to a new foreign agent during a communication session according to an embodiment of the invention.

FIG. 5 is a flow diagram of an exemplary method 500 for maintaining optimized communication after a mobile device transitions to a new foreign agent during a communication session according to an embodiment of the invention. At operation 502, a registration request from a mobile device associated with a communication session is received. The registration request may be a MIP registration request. At operation 504, a pool of IP addresses assigned to a first foreign agent associated with the mobile device is identified. In an embodiment, the pool is identified through an IP address of the first foreign agent, wherein the IP address of the first foreign agent is located within the registration request. At operation 506, an IP address from the identified pool of IP addresses is assigned to the mobile device. At operation 508, a second registration request from the mobile device for registering with a second foreign agent within the communication session is received. At operation 510, the assigned IP address is associated with an IP address of the second foreign agent. In an embodiment, the assigned IP address is associated with the IP address of the second foreign agent within a binding table of a home agent. At operation 512, the binding of the assigned IP address and the IP address of the second foreign agent is multicasted to all foreign agents within an optimization cluster.

FIG. 6 is a flow diagram of another exemplary method 600 for maintaining optimized communication after a mobile device transitions to a new foreign agent during a communication session according to an embodiment of the invention. At operation 602, data packets are transmitted to a destination mobile device via a first foreign agent within a communication session based on routing instructions found within a static routing table. In an embodiment, the data packets are transmitted by a foreign agent of a second mobile device within the communication session, and the static routing table is located within the foreign agent of the second mobile device. At operation 604, a message is received indicating the destination mobile device has moved to a second foreign agent within the communication session. At operation 606, a binding of an IP address of the destination mobile device and the second foreign agent is entered into a dynamic routing table. In an embodiment, the dynamic table is located within the foreign agent of the second mobile device. At operation 608, data packets are transmitted to the destination mobile device via the second foreign agent based on routing instructions found within the dynamic routing table.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable storage media having computer-useable instructions embodied thereon when executed by a computer performing a method for maintaining optimized communication after a mobile device transitions to a new foreign agent during a communication session, the method comprising:

receiving a first registration request from a mobile IP client associated with a communication session;

identifying a pool of IP addresses assigned to a first foreign agent associated with a mobile device of the mobile IP client;

assigning an IP address from the identified pool of IP addresses to the mobile device;

receiving a second registration request from the mobile IP client for registering with a second foreign agent within the communication session;

binding the assigned IP address with an IP address of the second foreign agent; and multicasting the binding of the assigned IP address and the IP address of the second foreign agent to all foreign agents within an optimization cluster.

2. The media according to claim 1, wherein the foreign agents within the optimization cluster are located in the same geographical location.

3. The media according to claim 1, wherein the foreign agents within the optimization cluster enter the binding into a dynamic routing table.

4. The media according to claim 3, wherein the foreign agents within the optimization cluster are programmed to follow routing instructions within the dynamic routing table before following conflicting instructions found in a static routing table.

5. The media according to claim 4, the method further comprising multicasting a termination message to all foreign agents within the optimization cluster.

6. The media according to claim 5, wherein the foreign agents delete the binding from the dynamic routing table when the termination message is received.

7. The media according to claim 6, wherein the foreign agents within the optimization cluster resume following the routing instructions within the static routing table when the binding is deleted from the dynamic routing table.

8. A system for maintaining optimized communication after a mobile device transitions to a new foreign agent during a communication session, comprising:

one or more home agents that assign pools of IP addresses to each of a plurality of foreign agents, assign an IP address to a mobile device from a pool of IP addresses associated with a first foreign agent when the mobile device registers with the first foreign agent for a communication session, update a binding table when the mobile device registers with a second foreign agent within the communication session, and multicast a message to multiple foreign agents within an optimization cluster informing the multiple foreign agents of the mobile device's registration with the second foreign agent; and one or more foreign agents that route data packets directly to the first foreign agent when the data packets include the assigned IP address, receive the multicasted message related to the mobile device's registration with the second foreign agent, and transmit the data packets directly to the second foreign agent when the data packets include the assigned IP address after receiving the message related to the mobile device's registration with the second foreign agent.

9. The system according to claim 8, wherein updating the binding table comprises associating the assigned IP address with the second foreign agent.

10. The system according to claim 8, wherein the one or more foreign agents are part of the optimization cluster.

11. The system of claim 8, wherein the multicasted message includes routing instructions informing the one or more foreign agents to transmit data packets that include the assigned IP to the second foreign agent.

12. The system according to claim 11, wherein the routing instructions are stored in a dynamic routing table of each of the one or more foreign agents.

13. The system according to claim 12, wherein the routing instructions are deleted from the dynamic routing table when a termination message is received.

* * * * *